(12) United States Patent
Wyatt et al.

(10) Patent No.: US 8,548,694 B2
(45) Date of Patent: *Oct. 1, 2013

(54) CONTROL SYSTEMS AND METHODS FOR ELECTRIC MOTORS OF UTILITY VEHICLES

(75) Inventors: Christopher K. Wyatt, Bradenton, FL (US); Ivan E. Fox, Mattoon, IL (US); David Jones, St. Charles, MO (US); Robert Jones, St. Peters, MO (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,270

(22) Filed: Sep. 14, 2012

(65) Prior Publication Data
US 2013/0066500 A1    Mar. 14, 2013

Related U.S. Application Data

(63) Continuation of application No. 13/290,914, filed on Nov. 7, 2011, now Pat. No. 8,296,003, which is a continuation of application No. 12/605,226, filed on Oct. 23, 2009, now Pat. No. 8,055,399.

(60) Provisional application No. 61/107,987, filed on Oct. 23, 2008, provisional application No. 61/155,749, filed on Feb. 26, 2009.

(51) Int. Cl.
*B60L 15/20* (2006.01)

(52) U.S. Cl.
USPC .............................................. 701/50; 701/22

(58) Field of Classification Search
None
See application file for complete search history.

(56) References Cited

U.S. PATENT DOCUMENTS

| | | | |
|---|---|---|---|
| 3,914,938 | A | 10/1975 | Cornell et al. |
| 5,406,778 | A | 4/1995 | Lamb et al. |
| 5,542,251 | A | 8/1996 | Leibing et al. |
| 5,794,422 | A | 8/1998 | Reimers et al. |
| 5,934,051 | A | 8/1999 | Hahn |
| 6,038,500 | A | 3/2000 | Weiss |
| 6,082,084 | A | 7/2000 | Reimers et al. |
| 6,109,009 | A | 8/2000 | Benson |
| 6,242,873 | B1 | 6/2001 | Drozdz et al. |
| 6,522,960 | B2 | 2/2003 | Nada |
| 6,523,334 | B1 | 2/2003 | Dettmann |
| 6,609,357 | B1 | 8/2003 | Davis et al. |

(Continued)

FOREIGN PATENT DOCUMENTS

| | | |
|---|---|---|
| DE | 4224359 C1 | 5/1993 |
| DE | 10148326 | 4/2003 |

(Continued)

OTHER PUBLICATIONS

Notification of Transmittal of the International Search Report and the Written Opinion of the International Searching Authority or the Declaration of PCT/US2009/061929 dated Jun. 4, 2009.

(Continued)

*Primary Examiner* — Michael J Zanelli
(74) *Attorney, Agent, or Firm* — Neal, Gerber & Eisenberg LLP

(57) ABSTRACT

Electronic control systems and related control methods for controlling electric auxiliary motors for performing work, such as electric deck motors for mower blades. The apparatus is shown in use with a vehicle that includes a mowing deck. Features of the control systems allow for safe and efficient use of the vehicle.

21 Claims, 13 Drawing Sheets

(56) References Cited

U.S. PATENT DOCUMENTS

| | | |
|---|---|---|
| 6,864,646 B2 | 3/2005 | Rahman et al. |
| 6,995,537 B1 | 2/2006 | Plutowski et al. |
| 7,007,446 B2 | 3/2006 | Dettmann |
| 7,017,327 B2 | 3/2006 | Hunt et al. |
| 7,126,237 B2 | 10/2006 | Walters et al. |
| 7,367,173 B2 | 5/2008 | Daly et al. |
| 7,532,968 B2 | 5/2009 | Kadota |
| 2003/0081632 A1 | 5/2003 | Kielhofer et al. |
| 2004/0124026 A1 | 7/2004 | Walters et al. |
| 2004/0160201 A1 | 8/2004 | Rahman et al. |
| 2006/0059879 A1 | 3/2006 | Edmond |
| 2008/0234096 A1 | 9/2008 | Joshi et al. |
| 2008/0289309 A1 | 11/2008 | Gust et al. |
| 2009/0000839 A1 | 1/2009 | Ishii et al. |
| 2009/0065273 A1 | 3/2009 | Wyatt et al. |
| 2009/0069964 A1 | 3/2009 | Wyatt et al. |
| 2009/0201650 A1 | 8/2009 | Hauser et al. |

FOREIGN PATENT DOCUMENTS

| | | |
|---|---|---|
| EP | 0151208 A1 | 8/1985 |
| EP | 1151892 A2 | 11/2001 |
| EP | 1228917 A1 | 8/2002 |
| EP | 1327547 A2 | 7/2003 |
| EP | 1645456 A2 | 4/2006 |
| JP | 2001320807 | 11/2001 |
| JP | 2003291692 | 10/2003 |
| JP | 2004100718 | 4/2004 |
| JP | 2007037366 | 2/2007 |
| JP | 2007236016 | 9/2007 |
| WO | 2006039520 A1 | 4/2006 |
| WO | 2006039521 A1 | 4/2006 |
| WO | 2009036208 A1 | 3/2009 |
| WO | 2009036211 A1 | 3/2009 |
| WO | 2010048561 A2 | 4/2010 |

OTHER PUBLICATIONS

Tractors: Specifications; Electric Lawn Tractors and Conversion Kits; Nov. 19, 2006; http://electricalawntractor.com.

Edmond Electric Company Ltd.; Patent Pending, Tested and Proven Design Apr. 25, 2007; http://electricalawntractor.com.

Jacobsen, A Textron Company; Jacobsen E-Plex II, Riding Greens Mowers; pp. 1-2; Version 3.0; Jan. 2007.

Jacobsen, A Textron Company; Jacobsen E-Walk, Walking Green Mowers, p. 1-2; Version 3.0; Jan. 2007.

Jacobsen, A Textron Company; The Toro Company, Mid-Duty Specifications: Electric e2065 Workman; Toro-Golf Course Management Workman, Apr. 24, 2007; htt;://www.toro.com.

European Office Action issued on Jun. 29, 2009 with regard to EP 07 799 218.8.

International Search Report and Written Opinion of the International Searching Authority issued on Mar. 20, 2009 with regard to PCT/US2008/076072.

International Search Report and Written Opinion of the International Searching Authority issued on Mar. 12, 2008 with regard to PCT/US2008/076069.

Institut En Genie De L'Energie Electrique; Power Electronic System (IGEE401) Week 8 Switch-Mode dc-ac Converters (Chapter 8), Images 1-24, pp. 1-12; author, date, publisher unknown.

Implementation of a Speed Field Oriented Control of 3-Phase PMSM Motor Using TMS320F240; Application Report SPRA 588; Texas Instruments, Inc.; pp. 26-32; date unknown.

Ohm, Daly and Oleksuk, Richard J.; Influence of PWM Schemes and Commutation Methods for DC and Brushless Motors and Drives; pp. 1-12; Presented at P.E. Technology 1002 C.; date unknown.

DC 12-24V 30A Three Phase Power Hardward for Either PMSM or AC Induction Machines; Literature No. BPRA071; Texas Instruments Europe, Dec. 1997; pp. 1-13.

Zambada, Jorge; Sensorless Field Oriented Control of PMSM Motors; Microchip AN1078; Microchip Technology Inc., 2007; pp. 1-30.

Dual PMSM Deck Controller

CONTROL SYSTEMS AND METHODS FOR ELECTRIC MOTORS OF UTILITY VEHICLES

CROSS-REFERENCE TO RELATED APPLICATIONS

This application is a continuation of U.S. patent application Ser. No. 13/290,914, filed Nov. 7, 2011, which is a continuation of U.S. patent application Ser. No. 12/605,226, filed Oct. 23, 2009, now U.S. Pat. No. 8,055,399, which claims the benefit of Provisional Application Ser. No. 61/107,987, filed Oct. 23, 2008 and Provisional Application Ser. No. 61/155,749, filed Feb. 26, 2009. Each patent application identified above is incorporated herein by reference in its entirety to provide continuity of disclosure.

TECHNICAL FIELD

This disclosure is generally related to utility vehicles, such as lawn and garden tractors and mowers, and more particularly to control systems, methods and processes for primary and auxiliary electric motor power systems.

BACKGROUND OF THE INVENTION

Utility vehicles, such as, for example, lawn and garden tractors and mowers, generally rely upon internal combustion engines as the prime mover transferring power through mechanical linkages (gearing or belts), hydrostatic drive(s) or other similar devices to propel or drive the vehicle. A deck of the utility vehicle is typically used to employ an auxiliary system, such as cutting blades of a lawn tractor. The majority of commercial and consumer mowers employ a deck (auxiliary) drive system using belts and pulleys driven by an engine typically with an electric clutch/brake to stop or drive the deck system. Other variants take the form of a power take off shaft in combination with pulleys and belts to drive multiple blade spindles in larger decks or to individually drive spindles with hydraulic motors in multiple deck or reel versions.

Utility vehicles incorporating electric motor(s) as primary mover(s) have emerged as viable alternatives to internal combustion utility vehicles, particularly due to rising oil and fuel prices. Consumers also want products with increased comfort and increasing versatility in smaller packages. Electric vehicles offer considerable advantages for reduction of emission of noise and pollution, as well as improved operator controls. These vehicles, which typically include one or more work accessories or auxiliary systems incorporating additional electric motors, also incorporate various forms and levels of control, depending upon the vehicle type, drive type, functional features, and other design aspects to ensure safe operation. With the advancement of these vehicle types and their functionality, various problems and needs have arisen in their design, operation, and functionality.

This disclosure is directed to addressing various problems, needs, and improvements in the general area of primary and auxiliary control systems and methods relating to utility vehicles.

SUMMARY OF THE INVENTION

Electronic control systems and related control methods and features for controlling electric motors of primary and auxiliary systems of utility vehicles or other utility power equipment. In exemplary embodiments, control systems and related control methods are disclosed in connection with auxiliary motors in the form of deck motors associated with a mowing deck of a mowing vehicle.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
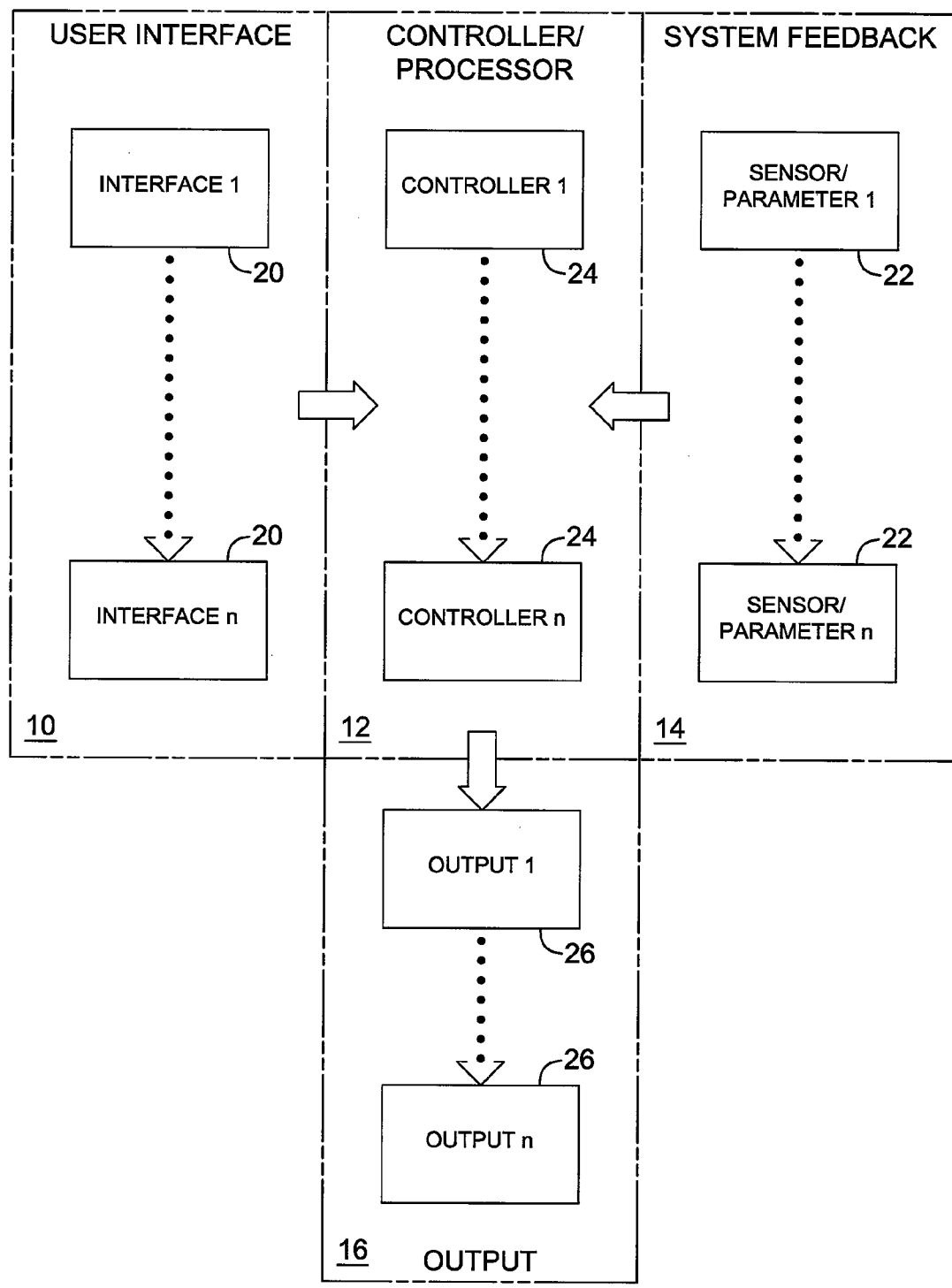
FIG. 1 is a block diagram depicting an overview of general control system architecture applicable to a vehicle contemplated by the principles of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

As referenced in FIG. 1, control systems for utility vehicles typically incorporate elements from four functional segments: a user interface segment 10, a controller/processor segment 12, a system feedback segment 14, and an output segment 16. Utility vehicles may incorporate one or more interfaces 20, such as, for example, a steering wheel, steering levers, an accelerator or other control pedal, a brake pedal or lever, a bypass switch, a power take off (PTO) switch, visual displays or meters, etc. These user interfaces fall into one of two categories, input interfaces, such as a steering wheel, and feedback interfaces, such as a battery meter. Utility vehicles may also incorporate one or more sensors or feedback architectures 22, such as, for example, speed sensors, steering sensors, accelerator sensors, temperature sensors, voltage sensors, current sensors, etc. The sensor(s) 22 and the user interface(s) 20 are in communication with one or more controllers/processors 24 of the system. The controller(s) 24 utilize inputs from one or more of the user interface(s) 20 and the sensor(s) 22 in processes and algorithms and provide one or more appropriate outputs 26 to various components of the vehicle. Output(s) 26 may include, for example, control and operational signals for one or more auxiliary devices, such as a motor for a mower blade or other implement, control and operational signals for one or more primary movers, such as an electric drive motor, control signals to one or more additional controllers, control signals to one or more drivers, signals outputted to user interfaces such as visual displays or meters, etc.

Figure 2:
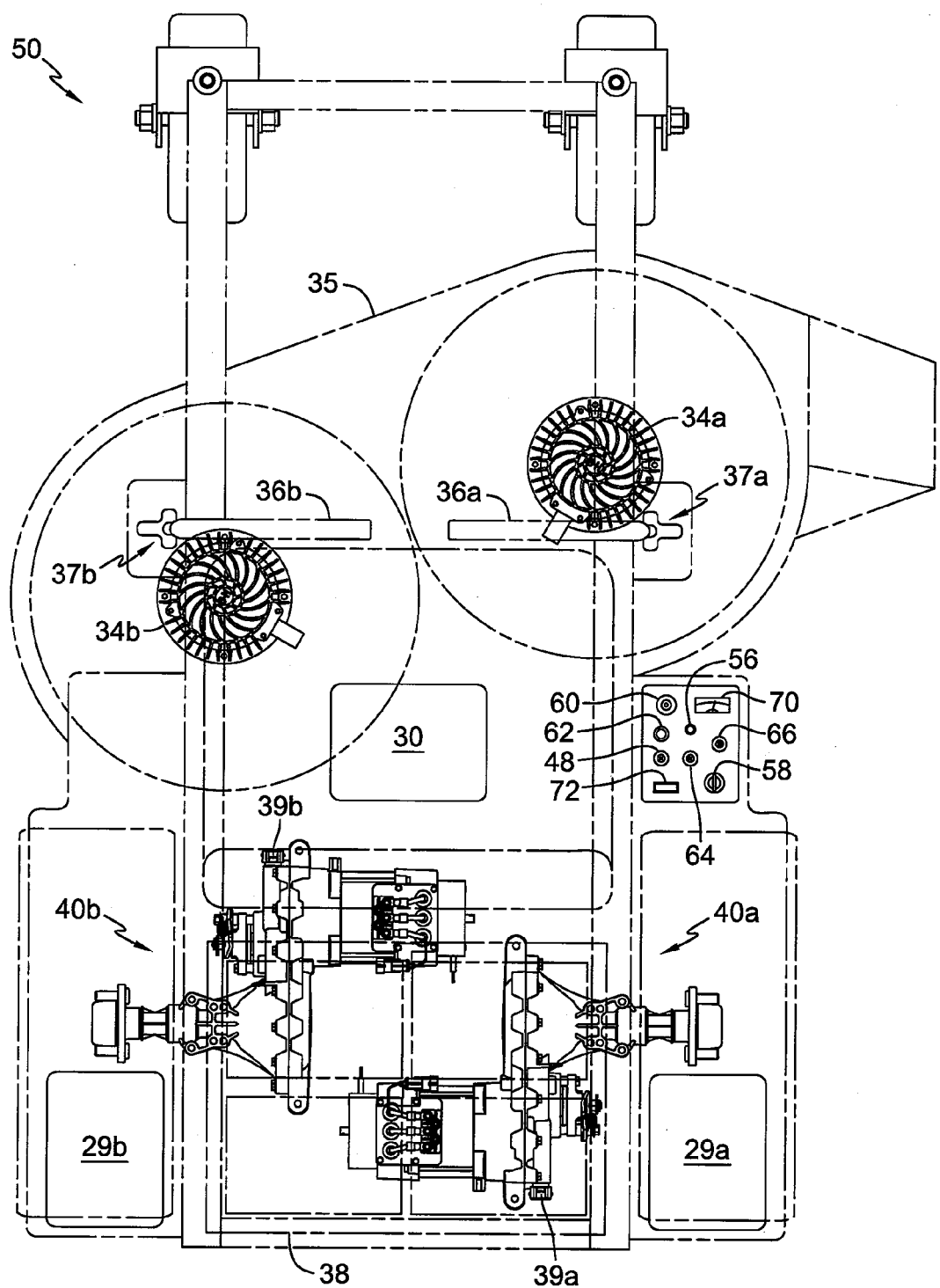
FIG. 2 is a top plan view of a first embodiment of a vehicle in the form of a riding lawn mower to which one or more principles or aspects of the present invention may be applied.

FIG. 2 illustrates a vehicle embodiment in the form of vehicle 50 that utilizes auxiliary devices. Vehicle 50 is a mowing vehicle that incorporates one or more principles of the present invention. Power supply 38 of vehicle 50 drives electric motor transaxles 40a and 40b, which each separately drive one of two rear wheels to implement zero turn vehicle functionality. It should be noted that the use of the term wheel is intended to cover all types of wheels, as well as gears, linkages, or other mechanisms that may ultimately translate into a traction implement, such as, for example, an inner wheel of a track arrangement on a track vehicle. In this embodiment, the electric transaxles 40a and 40b are nested in a side-by-side, parallel arrangement as shown in FIG. 2. The electric transaxles 40a and 40b utilize an electric motor to drive an associated axle and wheel. In a particular embodiment, the electric traction motor is a three phase AC induction motor rated for 1.7 kW continuous duty. Other motors and ratings, however, can be utilized. As shown in FIG. 2, vehicle 50 includes user interfaces, such as right and left drive levers 36a and 36b, an indicator LED or lamp 56, vehicle key switch 58, power take-off (PTO) switch 60, cruise switch 62, brake switch 66, battery gauge 70, and hour meter 72.

In the embodiment illustrated in FIG. 2, vehicle 50 incorporates a pair of traction controllers 29a and 29b and a deck controller 30. In this particular embodiment, the traction controllers 29a and 29b respectively control electric transaxles 40a and 40b, and when certain operational conditions are met, allow the operator of vehicle 50 to close PTO switch 60 to energize or allow activation of one or more functional outputs controlled by the deck controller 30. These functional outputs may include a variety of auxiliary equipment powered by electric auxiliary motors, such as deck motors 34a and 34b of mower deck 35 (illustrated), or in other embodiments, a snow thrower, a tiller, sweeper brooms, or other implements. In a particular embodiment, the deck motors 34a and 34b are electric motors in the form of permanent magnet synchronous motors (PMSMs). In another particular embodiment, the electric motors are 1.5 kW rated for continuous duty or power. Other motors and ratings, however, can be utilized. For example, a brushless DC (BLDC) motor may also be utilized.

In the embodiment of FIG. 2, the deck controller 30 controls deck motors 34a and 34b of the deck 35 of the vehicle 50. As will be described in more detail herein, in some embodiments the deck controller may comprise a pair of controllers to respectively control the deck motors 34a and 34b. In other embodiments, a single deck controller may be employed to control both deck motors 34a and 34b. The deck controller 30 is mounted to the deck or frame of the vehicle and is capable of electrical communication with the traction controllers 29a and 29b and the deck motors 34a and 34b. As already noted, in this particular embodiment, each of the deck motors are permanent magnet synchronous motors (PMSMs), however, other motor types may be implemented as well. In this embodiment, each of the deck motors has a blade that is directly coupled to its rotor such that the rotational speed of the rotor is also the rotational speed of its respective blade. In other embodiments, a reduction feature may be implemented, such as by gears or via direct control of the electric motor, to optimize rotational speed associated with the auxiliary equipment.

Figure 3:
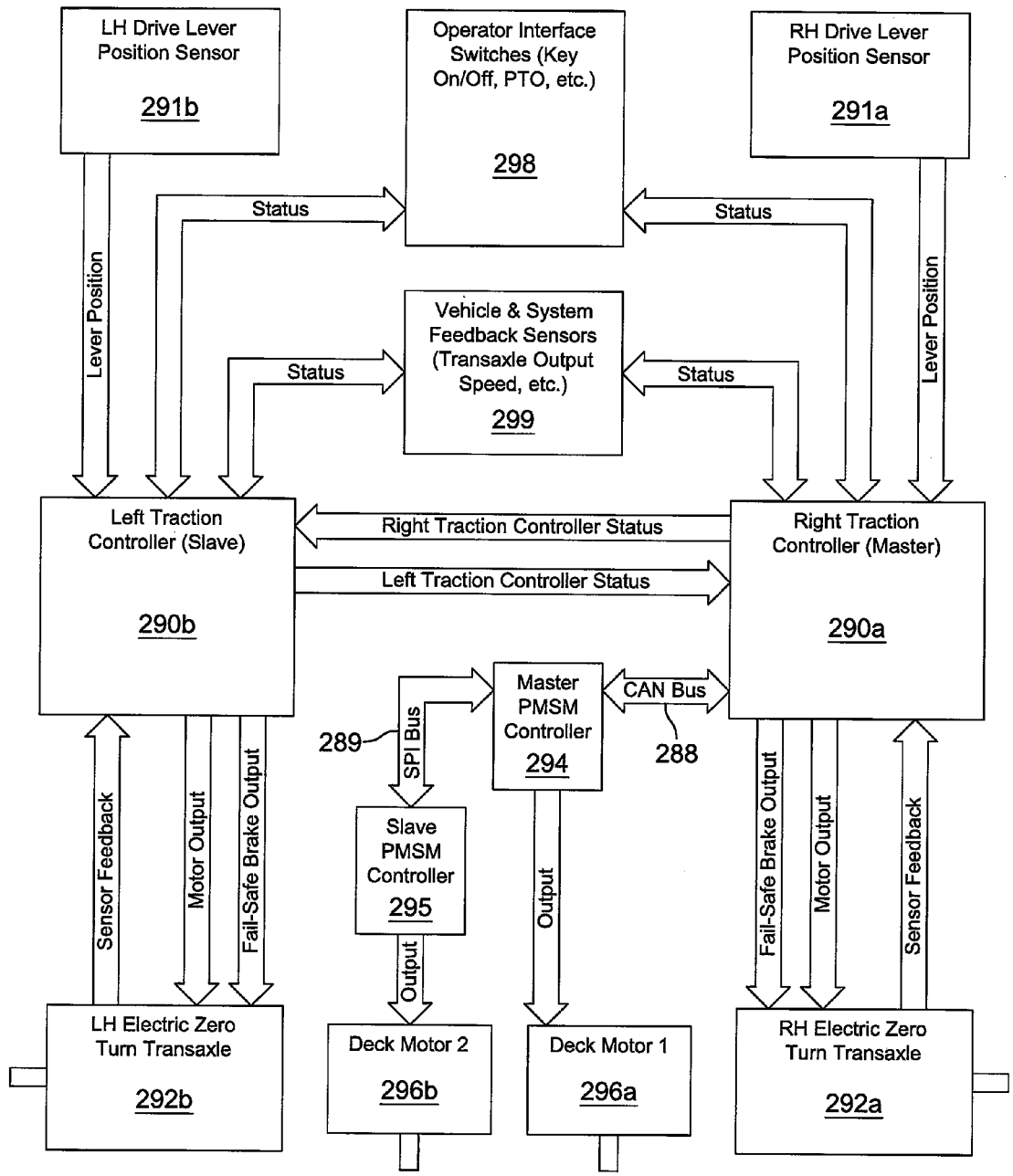
FIG. 3 is a block diagram of an embodiment of a control system applicable to a vehicle such as the vehicle depicted in FIG. 2.

FIG. 3 illustrates an embodiment of the functional relationship and communication between various components of a control system in accordance with one or more principles of the present invention, which can be adapted to vehicle 50. As illustrated in FIG. 3, a master traction controller 290a and a slave traction controller 290b communicate with each other with respect to status and values relating to various components and interfaces of the control system and the vehicle. Preferably, the master and slave traction controllers 290a and 290b communicate via a CAN bus or other bus type or communication standard. Additionally, master traction controller 290a is in direct communication with transaxle 292a and slave traction controller 290b is in direct communication with transaxle 292b. Master traction controller 290a also communicates with a master deck controller 294 preferably via CAN bus 288, which in turn communicates with slave deck controller 295, preferably via SPI bus 289. Both master and slave controllers respectively control right and left deck motors 296a and 296b. A right drive lever position sensor 291a is associated with the right drive lever and is in communication with the master traction controller 290a. Similarly, a left drive lever position sensor 291b is associated with the left drive lever and is in communication with the slave traction controller 290b. Other operator interfaces 298, such as, for example, key on/off, PTO, ROS, cruise, and brake, are in communication with traction controllers 290a and 290b.

Figure 4:
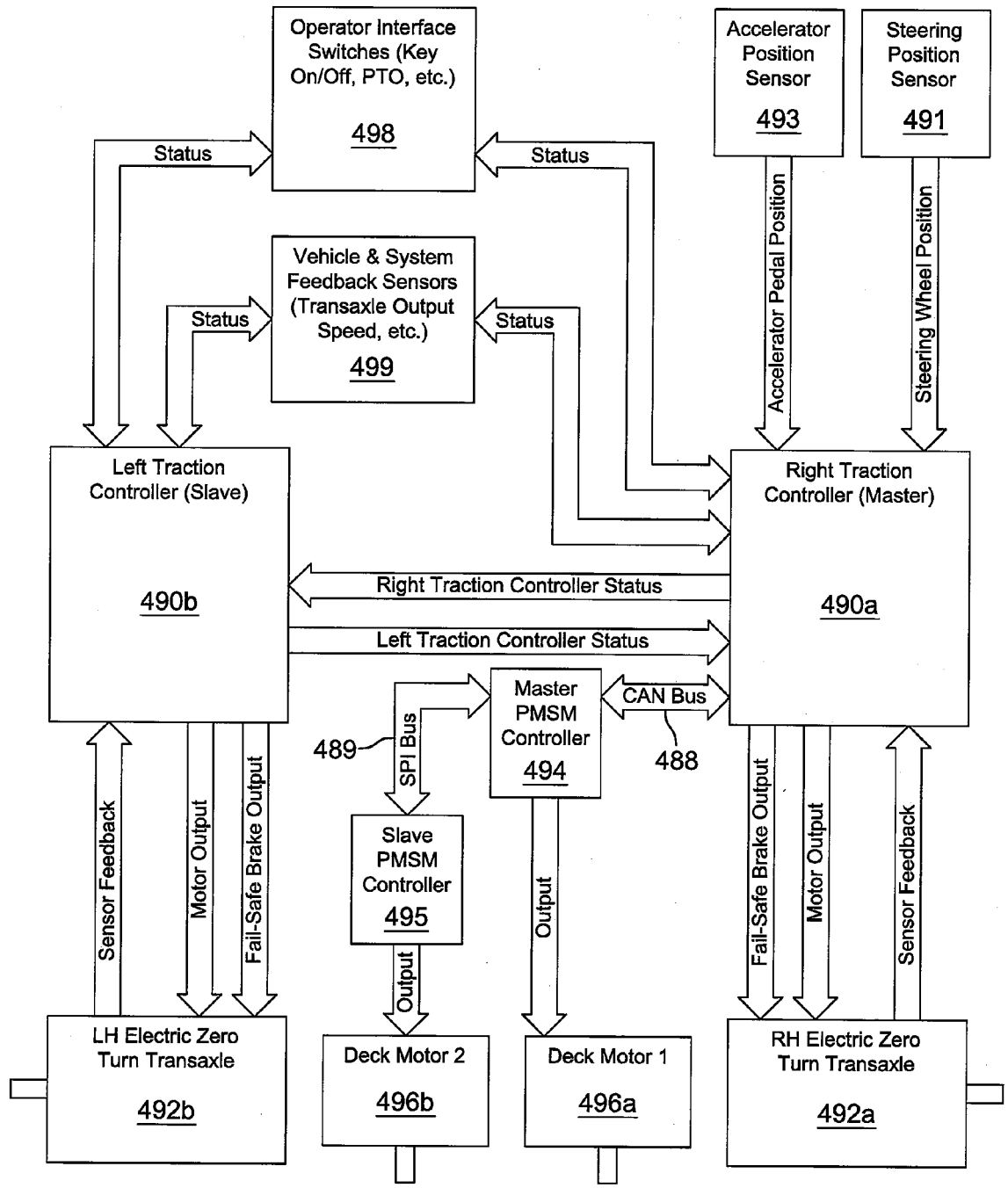
FIG. 4 is a block diagram of another embodiment of a control system applicable to a vehicle similar to that depicted in FIG. 2, but incorporating a steering wheel.

FIG. 4 illustrates another embodiment of the functional relationship and communication between various components of a control system in accordance with one or more principles of the present invention, which is also adaptable to vehicle 50. In this particular embodiment, a steering wheel is utilized to effectuate steering for a zero turn vehicle arrangement via master and slave fraction controllers, and a master motor controller and a slave motor controller are configured to control a pair of auxiliary motors in the form of deck motors, which drive mower blades. As illustrated in FIG. 4, a master traction controller 490a and a slave traction controller 490b communicate with each other in a manner similar to controllers 290a and 290b of FIG. 3. Master fraction controller 490a also communicates directly with transaxle 492a and slave fraction controller 490b communicates directly with transaxle 492b. Master traction controller 490a also communicates with a master motor controller 494, preferably via a CAN bus 488 (or other bus type or communication standard). In the particular embodiment illustrated, the master motor controller 494 communicates with auxiliary motor 496a and slave motor controller 495 via SPI bus 489. Slave motor controller 495 communicates with auxiliary motor 496b. Operator interfaces 498, such as, for example, key on/off, PTO, ROS, cruise, and brake, are in communication with traction controllers 490a and 490b. Master traction controller 490a also receives input from steering position sensor 491, accelerator position sensor 493, and may additionally receive input from vehicle and system feedback sensors 499 to improve control of the vehicle.

Figure 5:
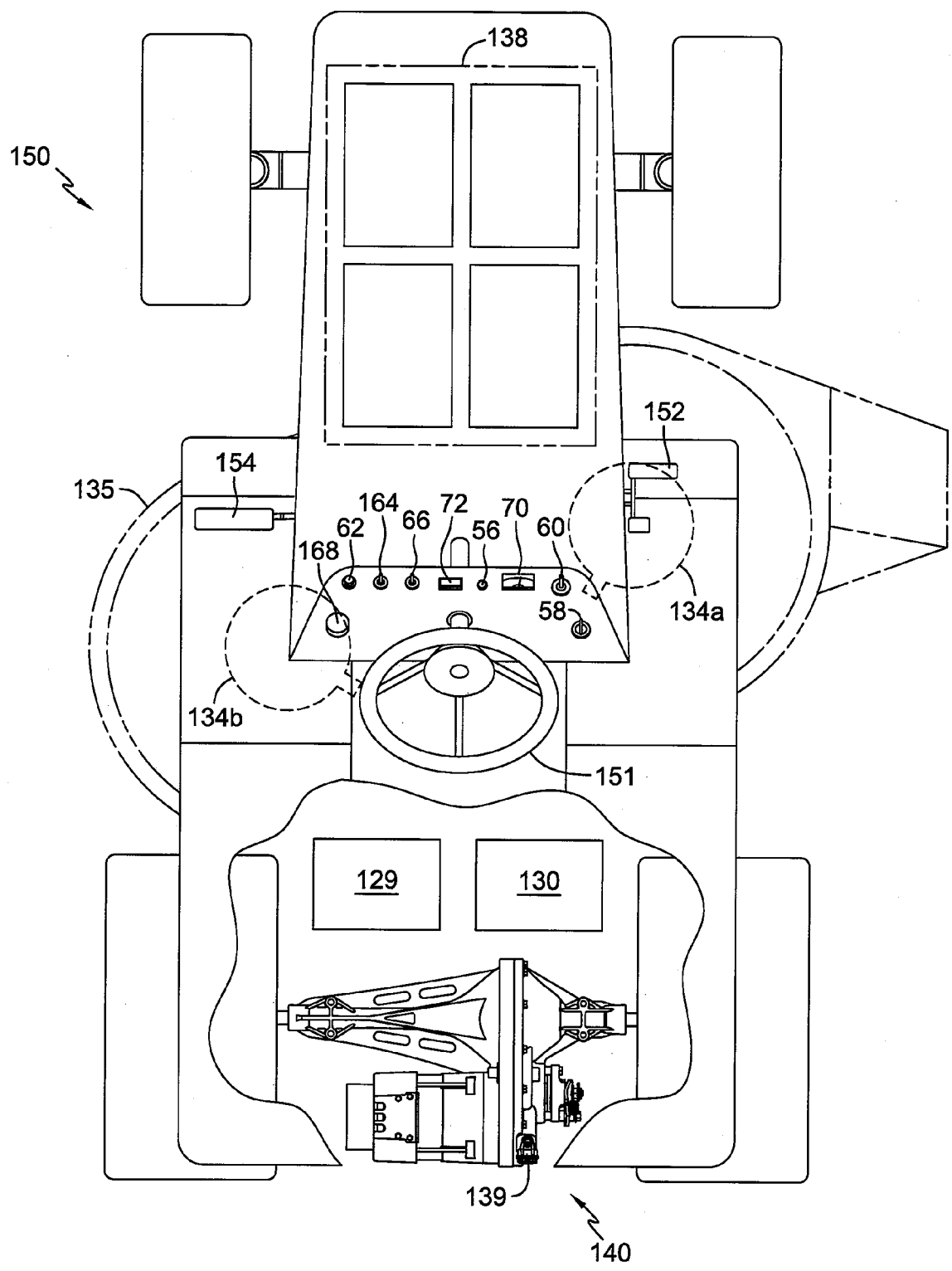
FIG. 5 is a top plan view of a second embodiment of a vehicle in the form of a riding lawn mower to which one or more principles or aspects of the present invention may be applied.

FIG. 5 illustrates a vehicle embodiment in the form of vehicle 150 that also utilizes auxiliary devices, wherein the vehicle 150 utilizes a single electric motor transaxle rather than the two electric motor transaxle embodiment of FIG. 2. Therefore, vehicle 150 includes a single traction controller 129. Power supply 138 of vehicle 150 drives electric motor transaxle 140, which drives an axle having rear wheels connected thereto. It should be noted that the use of the term wheel is intended to cover all types of wheels, as well as gears, linkages, or other mechanisms that may ultimately translate into a traction implement, such as, for example, an inner wheel of a track arrangement on a track vehicle.

As shown in FIG. 5, vehicle 150 includes user interfaces, such as steering wheel 151, accelerator pedal 152, brake pedal 154, an indicator LED or lamp 56, vehicle key switch 58, power take-off (PTO) switch 60, cruise switch 62, brake switch 66, battery gauge 70, and hour meter 72, and a reverse operating switch (ROS) 164.

As shown in FIG. 5, vehicle 150 includes a mower deck 135, which incorporates a pair of deck motors 134a and 134b. A deck controller 130 is in communication with the traction controller 129 and controls the deck motors 134a and 134b. As will be described in more detail herein, the deck controller 130 may comprise a pair of controllers to respectively control the deck motors 134a and 134b.

Figure 6:
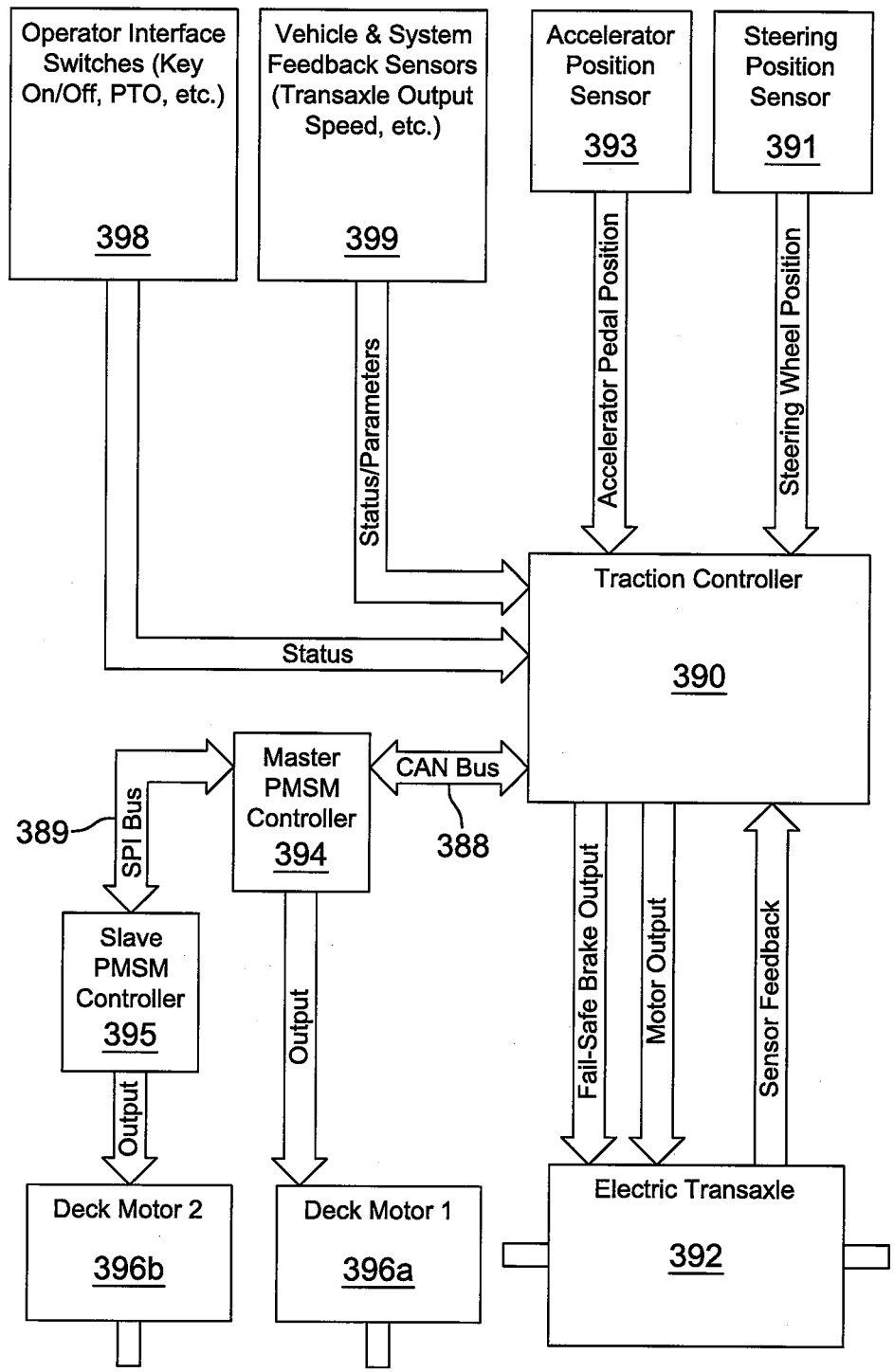
FIG. 6 is a block diagram of an embodiment of a control system applicable to a vehicle such as the vehicle depicted in FIG. 5.

FIG. 6 illustrates an embodiment of the functional relationship and communication between various components of a control system in accordance with one or more principles of the present invention, which can be adapted to vehicle 150 of FIG. 5 or similar vehicles. In this particular embodiment, a traction controller 390 is implemented to control functional aspects of an electric transaxle 392. Traction controller 390 is in communication with a plurality of user/operator interfaces 398, as well as vehicle and system feedback sensors 399, and an accelerator position sensor 393. Optionally, a steering position sensor 391 can be added to the control system to establish control functionality that includes steering position parameters. The traction controller 390 is also in communication with a master auxiliary controller 394, preferably via a CAN (Controller Area Network) bus 388. The master auxiliary controller 394 incorporates a slave controller 395, which is in communication with the master controller via an SPI (Serial Peripheral Interface) bus 389. Alternatively, all of the controllers can be configured to communicate directly to the CAN bus.

The foregoing embodiments are capable of integrated control of vehicle functionality. In accordance with the system architecture, signals from the vehicle, user interfaces, system sensors, the deck controllers, and the traction controllers can be shared to create a fully integrated control system. The integrated control between the traction controller(s) and the deck controller(s) provides a platform for numerous features and functionality for optimum performance and safety.

Figure 7:
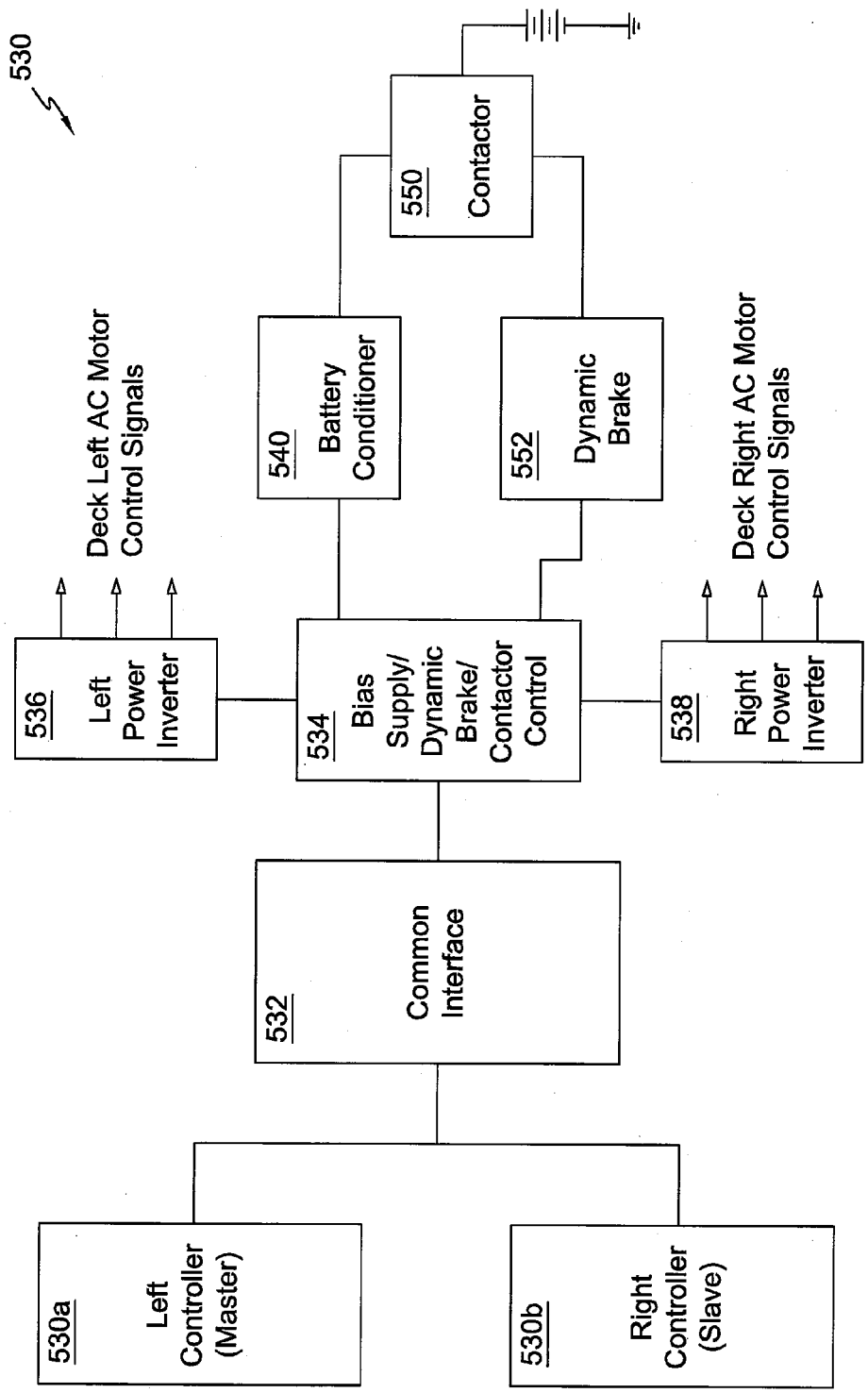
FIG. 7 is a block diagram of a deck controller in accordance with the principles of the present invention.

In a vehicle embodiment employing two auxiliary motors, such as deck motors associated with cutting blades of a mowing vehicle, the deck controller may be configured to have a first controller and a second controller, which may be integrated into one controller or may be separate controllers. FIG. 7 depicts a logic block diagram of a deck controller 530 for a vehicle utilizing two deck motors. Referring to FIG. 7, the deck controller 530 comprises several components, a left controller (master) 530a, a right controller (slave) 530b, a common interface 532, a bias supply/dynamic brake/contactor control 534, a left power inverter 536, a right power inverter 538, and a battery conditioner 540. The deck controller 530 optionally interfaces with a contactor 550 and a dynamic brake system 552.

Figure 8:
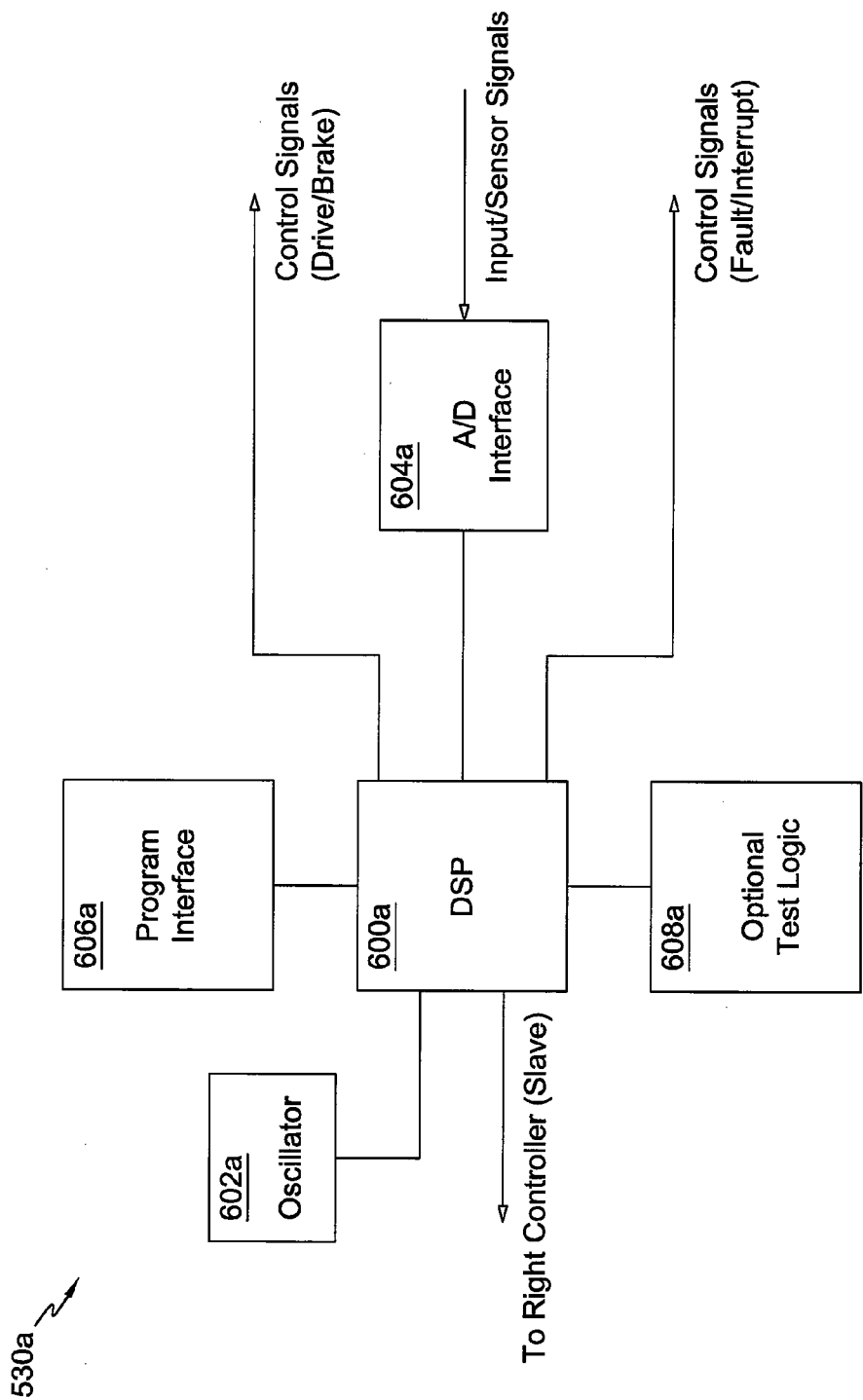
FIG. 8 is a block diagram of the left (master) controller depicted in FIG. 7 in accordance with the principles of the present invention.
Figure 9:
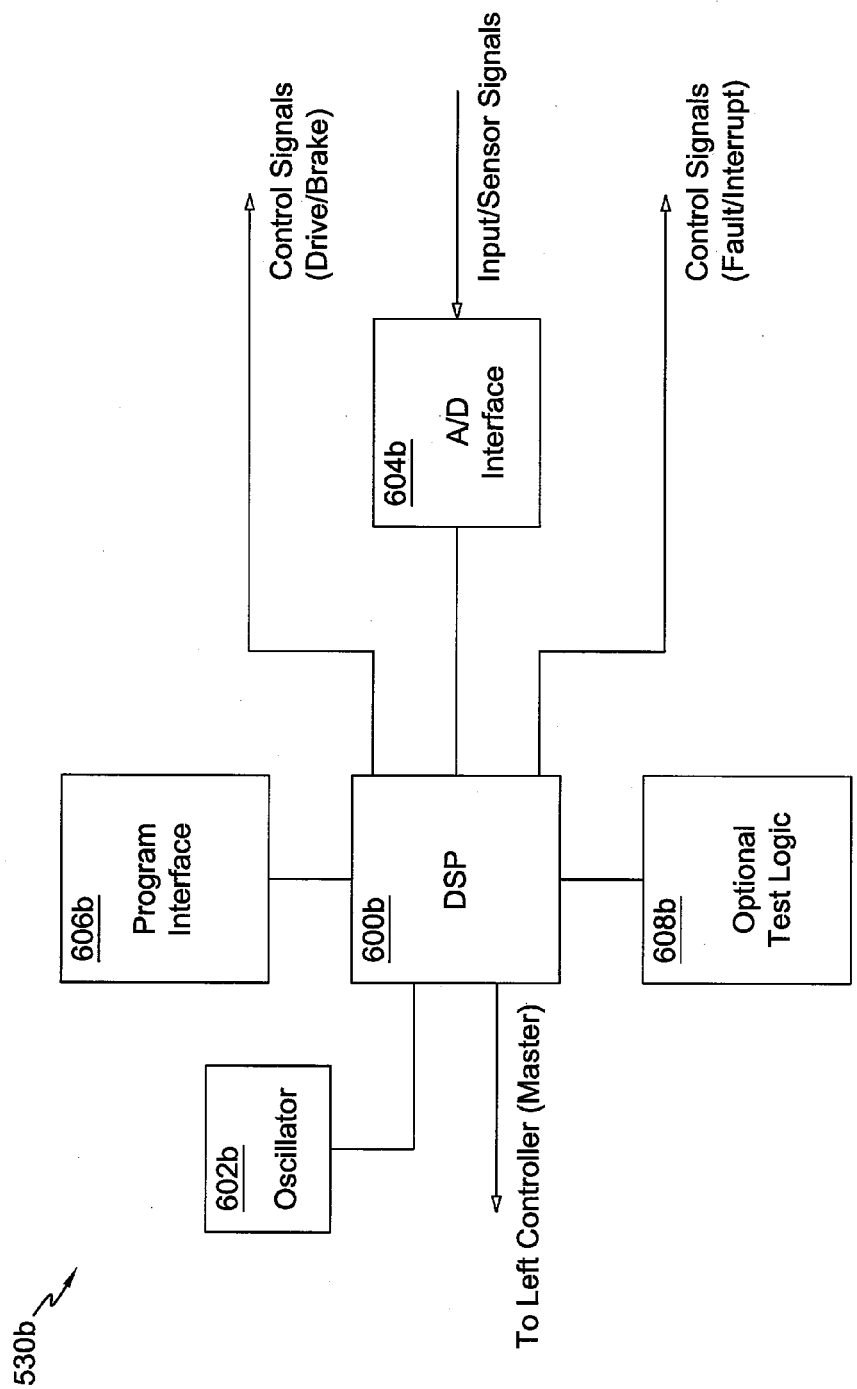
FIG. 9 is a block diagram of the right (slave) controller depicted in FIG. 7 in accordance with the principles of the present invention.

Referring to FIG. 8 and FIG. 9, each of the controllers 530a and 530b respectively include a digital signal processor (DSP) 600a, 600b, an oscillator 602a, 602b for clocking functions, an analog/digital (A/D) interface 604a, 604b, a program interface 606a, 606b, and optional test logic 608a, 608b. The A/D interface 604a, 604b receives inputs to the deck controller 530a, 530b and appropriately converts these inputs into a digital signal for processing by the DSP 600a, 600b. In a particular embodiment, the inputs to the deck controller 530a, 530b are supplied via a control connector connected to the deck controller 530 and having eight pins and a battery input supplying 48V, DC through the battery conditioner 540. Three of the pins are associated with the controller area network (CAN)-bus, which communicate with the traction controller. The three CAN-bus pins are a serial link to the CAN-bus, which comprises one transmit line, one receive line, and one ground line in a standard serial loop. Another three of the pins are associated with motor thermistor signals, which represent the temperature of the left and right deck motors. The thermistor signals are generated by thermistors placed in the windings of each motor. One of the pins is associated with the contactor coil ground, which is used to turn on/off the contactor 550. One pin is associated with an ignition switch. Thus, the inputs to the DSP generally include (1) the controller DC voltage level signal; (2) the PMSM current signal; (3) the hall effect AC signals; (4) the brake over-current signal; (5) the DC motor current signal; (6) the controller and motor temperature signals; (7) fault interrupt signals; (8) fault time from latches; and (9) the ignition status signal.

The CAN-bus pins are capable of receiving the following information from the traction controller: on/off signal for communicating the on or off state of the deck motors, speed data to control the speed of the deck motors, and direction data to control the clockwise or counter-clockwise direction of the deck motor rotors. In a particular embodiment, the speed data will be fixed to one or two speeds, on or off, or high and low speeds. In other embodiments, the speed data may be varied by a user over a broader range of speeds. The CAN-bus pins are capable of communicating at least the following information to the traction controller: status data, fault data, temperature data.

As illustrated in FIG. 8 and FIG. 9, each of the controllers 530a, 530b have output control signals relating to driving/braking functions and fault/interrupt functions, both associated with their respective deck motor. Collectively, the deck controller 530 has six outputs as illustrated in FIG. 7: three PMSM control signals to each deck motor, where each of the PMSM control signals to the left deck motor is 120 degrees out of phase, and where each of the PMSM control signals to the right deck motor is also 120 degrees out of phase. The PMSM control signals control the speed of each deck motor.

Figure 10:
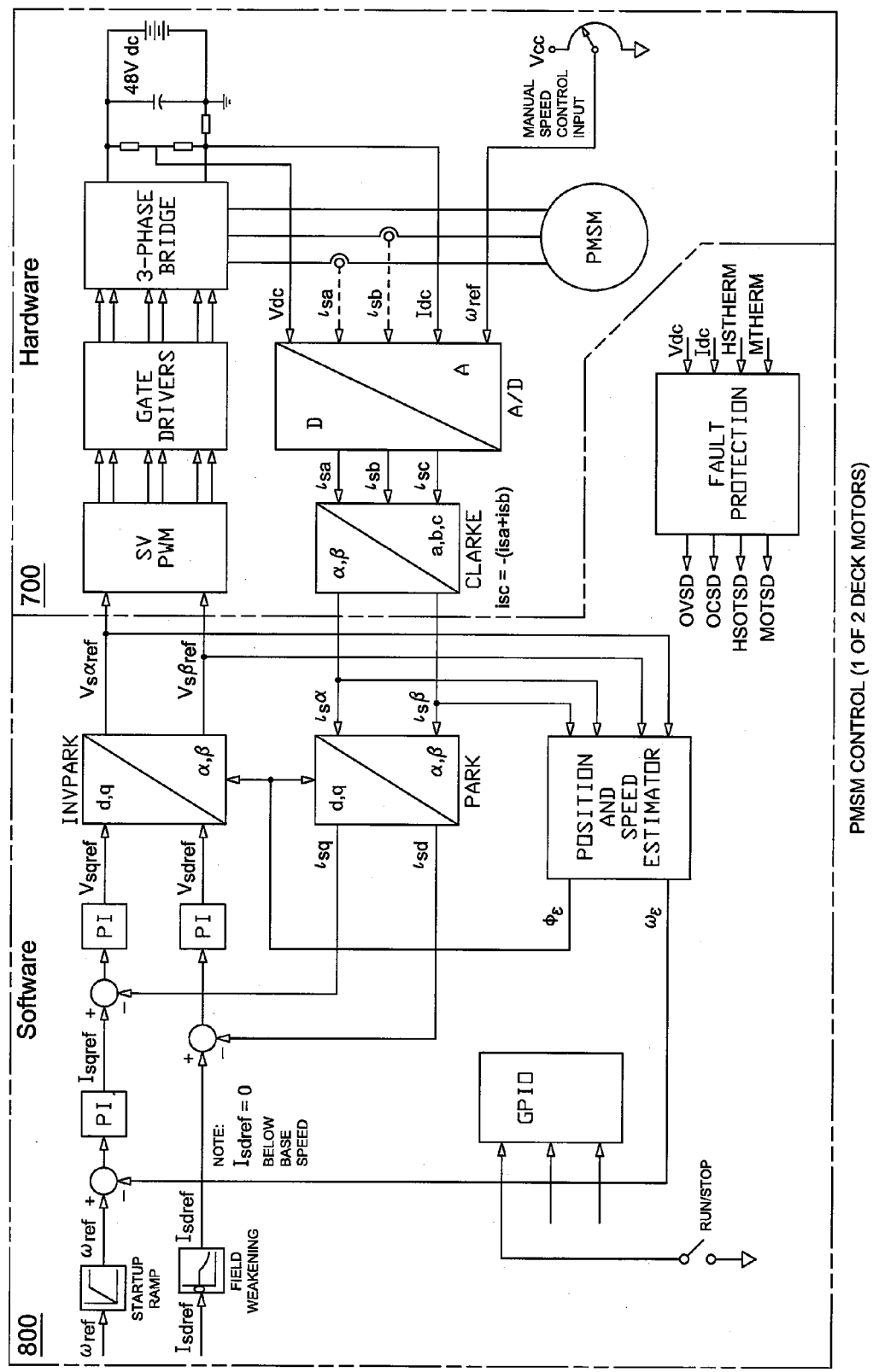
FIG. 10 is a control function block diagram illustrating electric motor control for each of the deck motors.

FIG. 10 is a circuit control diagram showing both hardware components 700 and software components 800 of each of the deck controllers 530a and 530b. It should be understood that any of the depicted components can be implemented through the use of software, hardware, firmware, or a combination thereof. The software components 800 are preferably resident in the DSP 600a, 600b, and include algorithms involved in sensorless field oriented control (FOC) of a PMSM motor. FOC theory allows use of DC control techniques for an AC motor. The algorithms include proportional/integral/derivative (PID), Park transform, inverse Park transform, position and speed estimator using the principals of field oriented control to the space vector pulse width modulation (PWM), and Clark transformation. Signals resulting from these algorithms are utilized by the hardware components 700. The gate drivers receive these signals and control the 3-phase bridge of the respective power inverter 536, 538, which controls the respective PMSM. Many types of processors, inverters, programmable logic controllers (PLCs), or the like could be utilized in accordance with the principles of the present invention. Furthermore, in certain embodiments, deck controller 530, and deck controllers 530a and 530b may each incorporate more than one axis controller or processor, depending on the architecture implemented and other functional needs. The 3-phase bridge preferably utilizes metal oxide semiconductor field effect transistors (MOSFETs), insulated gate bipolar transistors (IGBTs), or the like.

The left and right controller 530a, 530b are nearly identical. The left controller 530a is the master controller while the right controller 530b is the slave controller. The master controller directs the slave controller and is in direct communication with the connector of the deck controller 530.

As shown in FIG. 10, each of the DSPs also implements fault protection algorithms. Generally, these algorithms determine what actions will be taken when the left or right controller logic receives an interrupt signal. For example, the algorithms will dictate whether to shut down the deck control and/or deck motor; to re-try the deck controller after a predetermined period of time; and whether to clear the respective latches.

The DSP also implements the Field Oriented control (FOC) algorithm. In general, the input to this algorithm is either the Hall effect AC signals or the PMSM current signal. The FOC algorithm converts the three phases of the AC current in the respective deck motor into a DC reference frame using a Clark transform (Clarke transform), a Park transform and a position and speed estimator that estimates the speed and the position of the rotor based, in part, on the three phases of the AC current in the respective deck motor. The DC reference frame is equivalent to the reference frame of the rotor. Once in the DC reference frame the rotational speed and the magnetic flux of the motor can be controlled using conventional DC control techniques. Using the inverse Park and Clark transforms, the error between the desired speed and magnetic flux can be translated into suitable six controller PWM'd control signals.

Referring again to FIG. 7, the common interface 532 serves the following functions: (1) rail splitting functions to generate various reference signals for the comparators positioned throughout the deck control; (2) ignition sensing logic to sense when an ignition switch has been opened and closed and to sense when the battery voltage is in a safe operating range; (3) temperature fault sensing to generate when the temperature in the left or right deck motor is too high or when the temperature in the deck controller itself is too high; and (4) interrupt signal generation in response to certain fault conditions.

Interrupt signals are generated in response to the following recognized faults:
(1) a temperature fault in the left or right deck motors; (2) a temperature fault associated with the left side or right side of the deck controller; (3) an over-voltage condition as determined by the over-voltage comparator logic (from the bias supply logic, brake logic and contactor logic) and its generated over-voltage fault signal; and (4) an over-current fault during dynamic braking or contactor coil operation as determined by the brake/contactor coil over-current fault signal (from the bias supply logic, dynamic brake logic and contactor logic).

The common interface logic communicates the interrupt signals to the left or right controller logic. Temperature faults are communicated to the left or the right controller logic based on whether the fault is from the left or right side. Other faults are communicated to the left controller logic. The left or right controller logic receives the interrupt signals and is capable of reading latch data corresponding to the cause of the fault. When desired, the left or right controller logic sends a fault reset command to reset the latches after an interrupt signal is read.

Referring again to FIG. 7, the left and right power inverter are identical to each other. Each is coupled to receive (1) reset commands (from the left and right controller logic) so that the left and right power inverter logic can reset its internal latches that are used to report deck controller conditions to the left and right controller logic, (2) six controller PWM control signals to control six metal-oxide-semiconductor field-effect transistors (MOSFET) of the 3-phase bridge that generate the three PMSM control signals, (3) a controller DC voltage level signal representative of the voltage in the deck controller (from the bias supply logic, dynamic brake logic and contactor logic) so that the deck controller can protect the deck motors from over-voltage conditions, and (4) controller thermistor signals representative of the temperature of the deck controller (from thermistors positioned in the deck controller).

Each of the left and right power inverters output three PMSM control signals to respectively control each of the left and right deck motors. As noted, each of the three PMSM control signals is 120 degrees out of phase. Each of the left and right power inverters also generates the following outputs: (1) high trip over-current fault latch data representative of an over-current condition in a respective deck motor; (2) a DC motor current signal representative of the DC current seen in the deck motor; (3) hall effect AC signals representative of two of the three AC phase currents in each Deck Motor (i.e., two of the three PMSM control signals); and (4) a PMSM current signal representative of the overall AC current seen in each deck motor. Each of the above outputs is communicated to the respective left controller and the right controller. The high trip over-current fault latch data is stored in an internal latch of the respective power inverter for communication with the respective controller.

The hall effect AC signals are duplicative with the PMSM current signal to the extent that each measures the same thing: the AC currents in the deck motor for feedback to the left and right controller logic. In other embodiments, it is possible that only one of the hall effect AC signals and the PMSM current signal will be output from each of the left and right power inverter logic. In a preferred embodiment, the Hall effect AC signals are generated using two hall effect sensors coupled to receive two of the three PMSM control signals before transmission to the respective Deck Motor. In a preferred embodiment, the PMSM current signal is generated using (1) a DC Shunt positioned to receive the return current from the respective deck motor and (2) corresponding shunt reading logic.

Functionally, each of the left and right power inverters is capable of recognizing a high trip over-current fault condition, a low trip over-current fault condition and an over-voltage condition. Whenever either condition is recognized, the three PMSM control signals are driven to zero. In the event of a high trip over-current fault condition, the power inverter logic has recognized a high over-current condition and shuts down the three PMSM control signals until the respective left or right controller logic resets the latch storing the data indicative of this condition using a fault reset command. In the event of a low trip over-current fault condition, the power inverter has recognized a low over-current condition and drives the three PMSM control signals to zero until the next set of six controller PWM control signals are received from the respective power inverter. An over-voltage condition is recognized by receipt of a controller DC voltage level signal from the bias supply/dynamic brake/contactor control. When this signal is at a pre-determined level, it also drives the three PMSM control signals to zero.

Referring again to FIG. 7, the bias supply/dynamic brake/contactor control serves three functions: (1) the generation of various bias voltage supplies such that the various deck controller components may safely operate on a suitable voltage supply; (2) dynamic braking support or contactor support; and (3) the sensing of various fault conditions.

The bias supply logic uses: (1) a switching mode buck regulator circuit to generate a 15V, DC bias supply level from the 48V, DC battery; (2) a coupled inductor to generate a 5V, DC bias supply level from the 15V, DC bias supply level; (3) and a linear regulator to generate a 3.3V, DC bias supply level from the 5V, DC bias supply level. The bias supply levels are suitably coupled to the various components of the deck controller for power. The bias supply logic is coupled to the 48V, DC through an ignition switch, and is also coupled to the 48V, DC battery either directly or via an external contactor in an optional embodiment. The bias supply logic may also contain power hold logic which acts to feedback the generated 15V, DC bias supply level back to the bias supply logic in order to keep the bias supply logic enabled and generating the bias supply levels in the event the ignition switch is opened. This may be used to keep the deck controller alive to brake the deck motors following an opening of the ignition switch.

The contactor is coupled between the 48V, DC battery and the bias supply logic and acts as a secondary source of power. The main purpose of the contactor is to open and close the main power for the power inverters, if the contactor is opened it is impossible to drive the motor through the ignition only, for safety. Generally, if the ignition switch is opened by the user, the bias supply logic and the remainder of the deck controller will lose the 48V, DC voltage level from the battery. In order to maintain the bias supply levels when the ignition switch is opened to effectuate a controlled braking of the left and right deck motors, the contactor and contactor logic provides the battery voltage to the bias supply logic for a limited period of time to power the deck controller. The opening and closing of the contactor is controlled by the controller logic, which has knowledge of the open or closed state of the ignition switch via ignition sense logic. A particular advantage of the contactor logic is that it also provides reverse current protection and current leakage protection from the battery.

The dynamic brake logic can implement and control the absorption of excess voltage that is pumped back to the battery during regenerative braking A dynamic braking resistor is controlled by a dynamic brake PWM signal to absorb this voltage in lieu of the battery absorbing the load.

The bias supply/dynamic brake/contactor control includes the following fault sensing capabilities: (1) over-voltage comparator logic that generates an over-voltage fault signal, which indicates whether the DC voltage from the battery is in an over-voltage condition; (2) controller DC voltage sensing logic that generates the controller DC voltage level signal representative of the DC voltage from the battery; and (3) brake/contactor coil current sensing logic that generates a brake/contactor coil over-current fault signal and a brake/contactor coil over current signal that respectively represent whether a fault exists due to an over-current condition during dynamic braking or contactor coil operation and the corresponding current level.

Referring again to FIG. 7, the battery conditioner is coupled between the 48V, DC battery and the bias supply logic, dynamic brake logic and contactor logic. Generally, the battery conditioning logic comprises surge limits to prevent the battery inrush when the deck is first powered on, electromagnetic interference (EMI) filters to prevent radio interference, and a capacitor network to limit voltage arching when first powered on.

Figure 11:
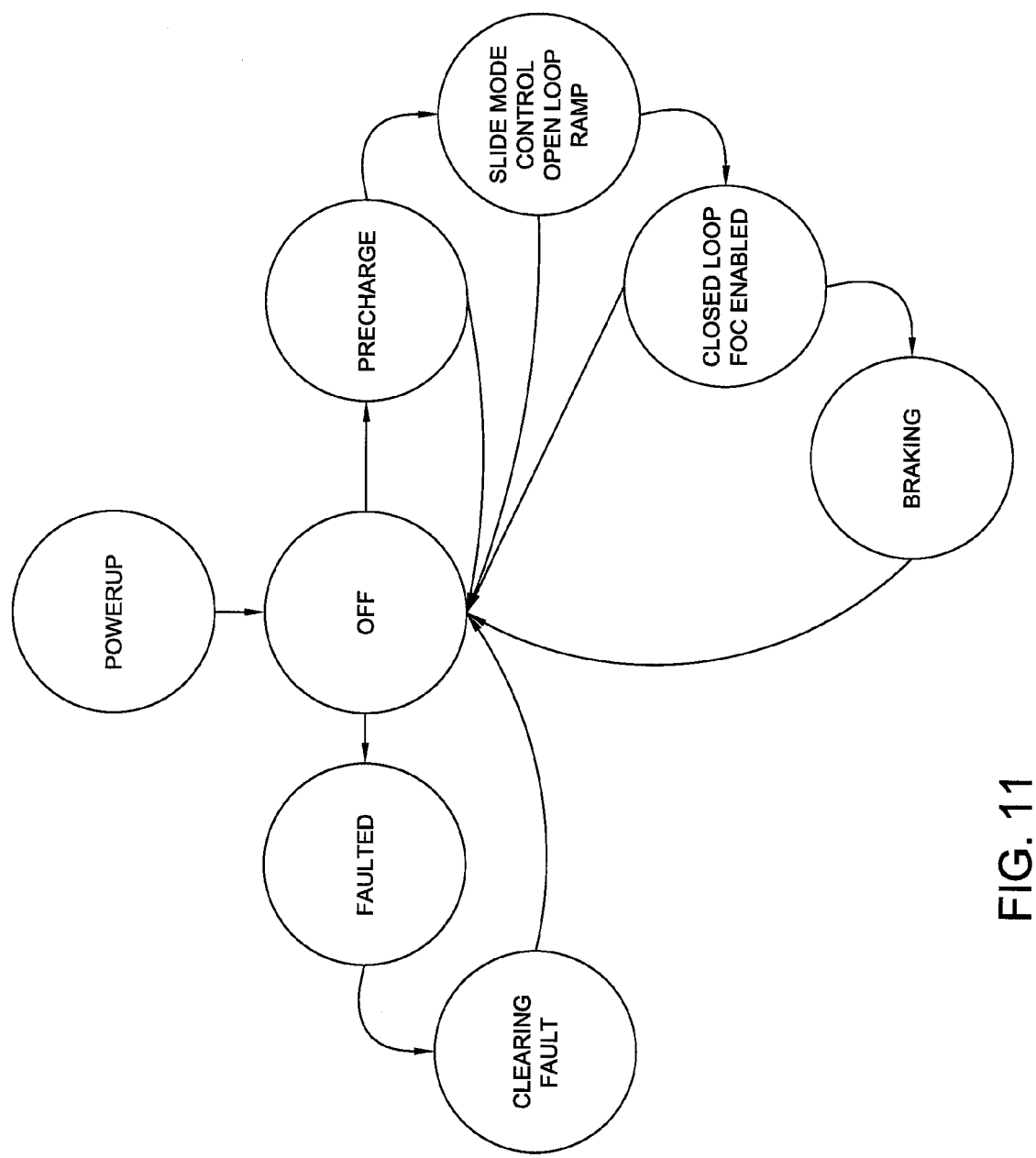
FIG. 11 is a bubble state map depicting the operational states associated with control of the electric deck motors.

FIG. 11 illustrates a bubble-state map for the motor control structure. As shown, the motor control has a power up state, an off state, a precharge state, a slide-mode-control open-loop-ramp state, a closed-loop FOC-enabled state, a braking state, a faulted state, and a clearing fault state. The slide mode control open loop ramp state is the initial state of the motor when it is driven to pre-determined inputs. After the rotor speed reaches a predetermined amount (e.g., 900 RPM), the control loop is closed and the control is in the closed loop FOC enabled state, where the FOC algorithms are used to drive the motors.

Figure 12:
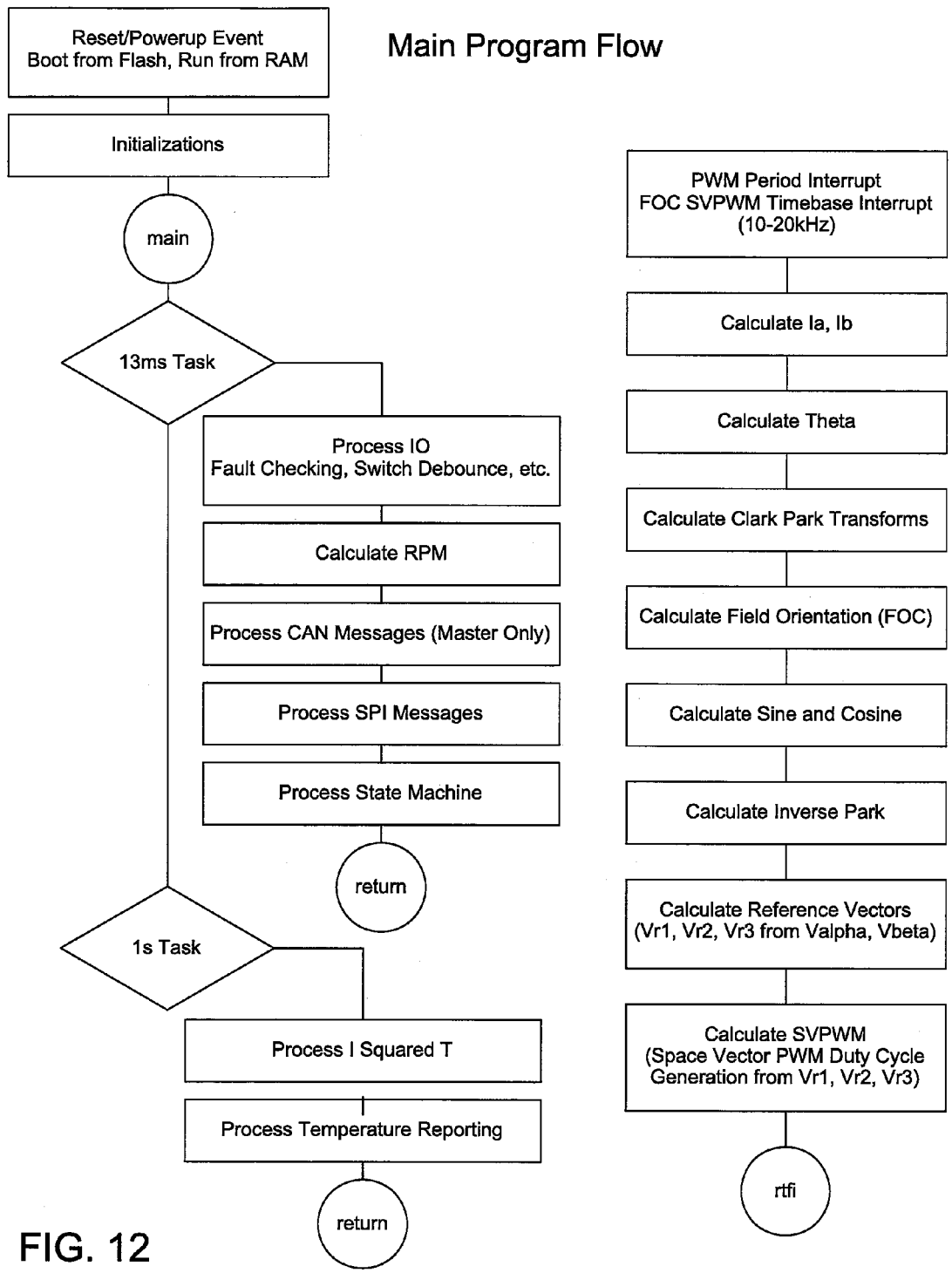
FIG. 12 illustrates flow charts of a main program flow associated with the deck controller.

FIG. 12 illustrates flow charts for the main program flow associated with the deck controller in operation. The controllers 530a and 530b perform the tasks of processing input/outputs, calculating RPM, Processing SPI messages, and processing state machine. In addition, the left or master controller processes CAN-bus messages. These processes are run in a predetermined interval, and in this particular embodiment, every 13 ms. In addition, temperature processing and overload protection processing ($I^2T$ methods) occurs at a predetermined interval, and in this particular embodiment, every second. The remaining process involves application of FOC techniques to drive the motors.

In should be noted that one or more aspects of the control architecture depicted in FIGS. 8-10 can generally be applied to the traction controller as well, or any other controller involved in driving an electric motor of the vehicle.

As those skilled in the art would understand and appreciate, the foregoing embodiments of motor drive control may implement numerous different PWM schemes for controlling current through the motor. While dual-sided PWM schemes are contemplated, in alternate embodiments, single-sided PWM schemes may also be employed. As understood by those skilled in the art, dual-sided PWM schemes (or 4-quadrant switching) utilize pulse-width modulation of switches on both sides of an H-bridge or 3-phase bridge (for three-phase motors) to effectuate pulse-width modulation. In a typical dual-side scheme, each set of switches of the bridge are pulse-width modulated independently such that the variation and overlap between the resulting PWM signals defines the current to the electric motor. On the other hand, single-sided PWM schemes (two-quadrant switching) pulse-width modulate the switches on one side of the bridge for controlling the magnitude of the current to the electric motor, while utilizing the switches on the other side of the bridge to control the direction of current to the electric motor. Single-sided PWM schemes may be beneficial to reduce switching noise within the circuits because the switches involved in controlling the direction of current switch less frequently than the switches involved in controlling the magnitude of the current.

Figure 13:
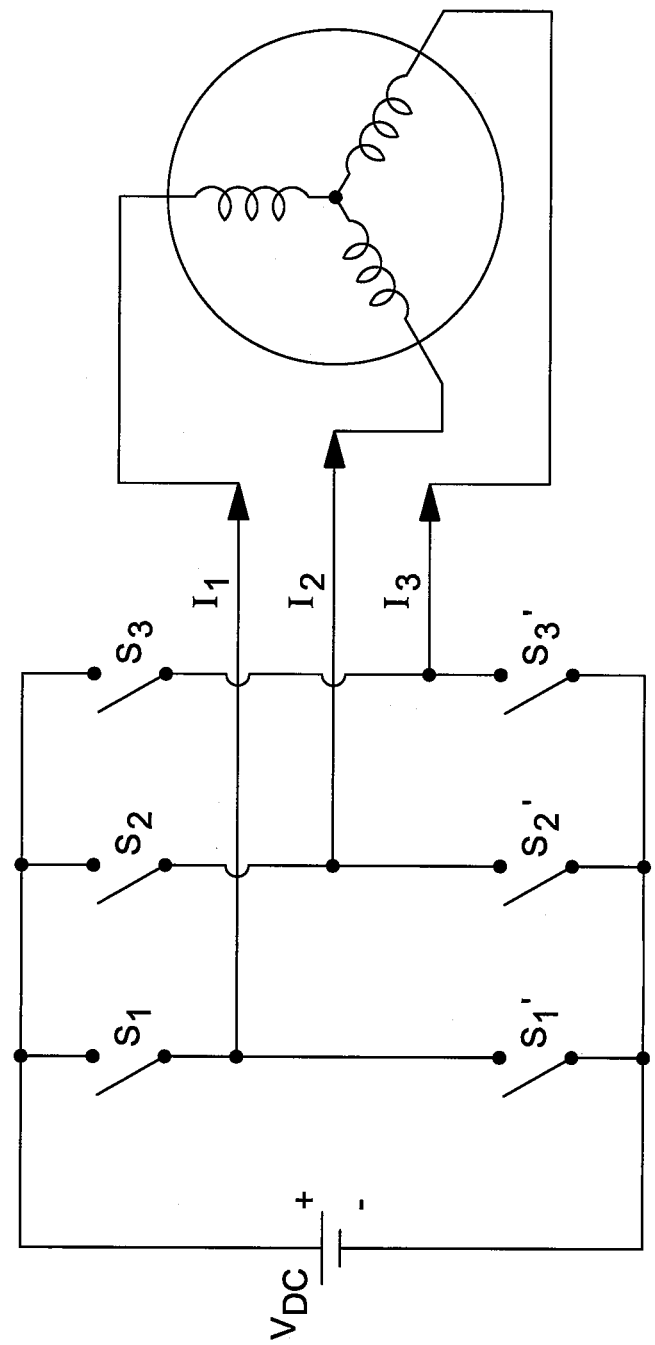
FIG. 13 is a general schematic diagram of a 3-phase bridge generally representing the type utilized in connection with pulse-width modulation to generate motor current to drive the motor.

To illustrate a single-sided or two-quadrant switching scheme, FIG. 13 is provided, which is a schematic diagram of a 3-phase bridge comprising three switch pairs, $S_1$ and $S_1'$, $S_2$ and $S_2'$, and $S_3$ and $S_3'$. $S_1$, $S_2$ and $S_3$ are on the high-side bus and $S_1'$, $S_2'$, and $S_3'$ are on the low side bus. The switch pairs are configured to provide respective motor current ($I_1$, $I_2$, and $I_3$) for each of the phases of the motor. In a single-sided scheme, a positive first phase voltage is supplied to the motor by activating switch $S_2'$ in a constantly ON state while switch $S_1$ is pulse-width modulating. When both $S_1$ and $S_2'$ are ON, current $I_i$ increases to drive the motor in a forward direction state. During the period where no pulse-width modulation occurs, the current is slowly decaying (sometimes referred to as free-wheeling) in a short circuit state. When a negative first phase voltage is applied by activating switch $S_1'$ in a constantly ON state while switch $S_2$ is pulse-width modulating, current $I_1$ increases to drive the motor in a reverse direction state. Only two switching events occur in a PWM period. The foregoing results will be similar when only the low side switches are modulated.

It should be noted that the term "switch" or "switch device" is intended to include, but not be limited to, any semiconductor or solid state component or device, either singly or in combination with other components or devices, that can control current based on a control input applied to the component(s) or device(s). Merely by way of example, such switches may include field effect transistors, such as MOS-FETS, insulated gate bipolar transistors (IGBTs) or the like. Due to the magnitude of current utilized in electric motors for utility vehicle applications, MOSFETS or other similar components capable of handling high current levels and resulting heat generation are preferred.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof

What is claimed is:

1. A utility vehicle comprising:
a plurality of vehicle systems comprising a steering system, an accelerator system, a power system, a traction system, and an auxiliary system;
a plurality of operator interfaces for operating the vehicle each associated with one of the plurality of vehicle systems;
a plurality of sensors each associated with at least one of the plurality of vehicle systems; and
an electric motor control system in communication with the plurality of vehicle systems, the plurality of operator interfaces, and the plurality of sensors;
the traction system comprising:
at least one drivable wheel;
at least one electric drive transaxle engaged with the drivable wheel;
the auxiliary system comprising:
an auxiliary mechanism; and
an AC electric auxiliary motor engaged with the auxiliary mechanism;
the electric motor control system comprising:
a traction controller in communication with the steering system, the accelerator system, at least one of the plurality of operator interfaces, at least one of the plurality of sensors, the power system, the auxiliary system, and the at least one electric drive transaxle of the traction system; and
an auxiliary controller in communication with the traction controller, the power system, and the AC electric auxiliary motor, wherein the auxiliary controller applies field oriented control to the AC electric auxiliary motor and controls the AC electric auxiliary motor via at least one DC control technique.

2. The utility vehicle of claim 1, wherein:
at least one of the plurality of sensors comprises a Hall effect sensor for detecting a position of a rotor of the AC electric auxiliary motor; and
the auxiliary controller is further in communication with the Hall effect sensor.

3. The utility vehicle of claim 1, wherein the auxiliary mechanism comprises a cutting blade mechanism.

4. The utility vehicle of claim 1, further comprising a data bus that provides communication between the traction controller and the auxiliary controller.

5. The utility vehicle of claim 1, wherein the AC electric auxiliary motor comprises an AC PMSM motor.

6. The utility vehicle of claim 1, wherein the auxiliary controller further comprises a 3-phase bridge circuit for driving the AC electric auxiliary motor.

7. The utility vehicle of claim 1, further comprising a digital signal processor programmed with a field oriented control algorithm to generate at least one driver signal for driving the AC electric auxiliary motor.

8. A utility vehicle comprising:
a plurality of vehicle systems comprising a steering system, an accelerator system, a power system, a traction system, and an auxiliary system;
a plurality of operator interfaces for operating the utility vehicle each associated with one of the plurality of vehicle systems;
a plurality of sensors each associated with at least one of the plurality of vehicle systems; and
an electric motor control system in communication with the plurality of vehicle systems, the plurality of operator interfaces, and the plurality of sensors;
the traction system comprising:
at least one drivable wheel; and
at least one electric drive transaxle engaged with the at least one drivable wheel;
the auxiliary system comprising:
an auxiliary mechanism; and
an AC electric auxiliary motor engaged with the auxiliary mechanism;
the electric motor control system comprising:
a traction controller in communication with the steering system, the accelerator system, at least one of the plurality of operator interfaces, at least one of the plurality of sensors, the power system, the auxiliary system, and the at least one electric drive transaxle of the traction system; and an auxiliary controller in communication with the traction controller, the power system, and the AC electric auxiliary motor, the auxiliary controller comprising:
- a digital signal processor configured to receive and process data signals received from at least one of the plurality of vehicle systems, and output at least one driver signal for driving the AC electric auxiliary motor;
- an analog/digital interface in communication with the digital signal processor and configured to receive analog data signals from at least one of the plurality of vehicle systems, convert the analog data signals to digital data signals, and send the digital data signals to the digital signal processor; and
- an oscillator in communication with the digital signal processor to effectuate output of a clocking signal for the digital signal processor.

9. The utility vehicle of claim 8, wherein the auxiliary controller applies field oriented control to the AC electric auxiliary motor and controls the AC electric auxiliary motor via at least one DC control technique with the at least one driver signal.

10. The utility vehicle of claim 9, wherein:
- at least one of the plurality of sensors comprises a Hall effect sensor for detecting a position of a rotor of the AC electric auxiliary motor; and
- the auxiliary controller is further in communication with the Hall effect sensor.

11. The utility vehicle of claim 9, wherein the field oriented control comprises sensorless field oriented control.

12. The utility vehicle of claim 11, wherein the digital signal processor has processor executable instructions stored therein for performing the steps of:
- receiving three phase signals each indicative of one of each phase of AC current in the AC electric auxiliary motor;
- converting the phase signals into a DC reference frame utilizing a Clark Transform, a Park Transform, a rotor position estimator, and a speed estimator;
- receiving at least one control signal associated with the AC electric auxiliary motor and determining a desired speed of the AC electric auxiliary motor;
- applying an Inverse Park Transform and the Clark Transform to the DC reference frame to determine an error between an actual magnetic flux associated with the estimators and a desired magnetic flux associated with the desired speed; and
- generating the at least one driver signal as a plurality of pulse-width modulated control signals based on the error to drive the AC electric auxiliary motor.

13. The utility vehicle of claim 8, wherein the auxiliary mechanism comprises a cutting blade mechanism.

14. The utility vehicle of claim 8, further comprising a data bus that provides communication between the traction controller and the auxiliary controller.

15. The utility vehicle of claim 8, wherein the AC electric auxiliary motor comprises an AC PMSM motor.

16. The utility vehicle of claim 8, wherein the auxiliary controller further comprises a 3-phase bridge circuit for driving the AC electric auxiliary motor.

17. The utility vehicle of claim 8, wherein the digital signal processor is programmed with a field oriented control algorithm to generate the at least one driver signal.

18. A utility vehicle comprising:
- a plurality of vehicle systems comprising a steering system, an accelerator system, a power system, a traction system, and an auxiliary system;
- a plurality of operator interfaces for operating the utility vehicle each associated with one of the plurality of vehicle systems;
- a plurality of sensors each associated with at least one of the plurality of vehicle systems; and
- an electric motor control system in communication with the plurality of vehicle systems, the plurality of operator interfaces, and the plurality of sensors;

the traction system comprising:
- at least one drivable wheel; and
- at least one electric drive transaxle engaged with the at least one drivable wheel;

the auxiliary system comprising:
- a first auxiliary mechanism and a first AC electric auxiliary motor engaged with the first auxiliary mechanism; and
- a second auxiliary mechanism and a second AC electric auxiliary motor engaged with the second auxiliary mechanism;

the electric motor control system comprising:
- a traction controller in communication with the steering system, the accelerator system, at least one of the plurality of operator interfaces, at least one of the plurality of sensors, the power system, the auxiliary system, and the at least one electric drive transaxle of the traction system; and
- an auxiliary control system in communication with the fraction controller, the power system, the first AC electric auxiliary motor, and the second AC electric auxiliary motor, the auxiliary control system comprising:
  - a first controller;
  - a second controller;
  - a common interface in communication with the first controller and the second controller;
  - a first power inverter in communication with the common interface and the first AC electric auxiliary motor; and
  - a second power inverter in communication with the common interface and the second AC electric auxiliary motor;
  - wherein each of the first controller and the second controller applies field oriented control to the first AC electric auxiliary motor and the second AC electric auxiliary motor and controls the first AC electric auxiliary motor and the second AC electric auxiliary motor via at least one DC control technique.

19. The utility vehicle of claim 18, wherein the first auxiliary mechanism and the second auxiliary mechanism each comprises a cutting blade mechanism.

20. The utility vehicle of claim 18, wherein the first AC electric auxiliary motor and the second AC electric auxiliary motor each comprises an AC PMSM motor.

21. The utility vehicle of claim 18, wherein:
- at least one of the plurality of sensors comprises a Hall effect sensor for detecting a position of a rotor of the first AC electric auxiliary motor and the second AC electric auxiliary motor; and
- the auxiliary control system is further in communication with the Hall effect sensor.

* * * * *

UNITED STATES PATENT AND TRADEMARK OFFICE
CERTIFICATE OF CORRECTION

| | | |
|---|---|---|
| PATENT NO. | : 8,548,694 B2 | Page 1 of 1 |
| APPLICATION NO. | : 13/618270 | |
| DATED | : October 1, 2013 | |
| INVENTOR(S) | : Wyatt et al. | |

It is certified that error appears in the above-identified patent and that said Letters Patent is hereby corrected as shown below:

In the Specification

Column 4, line 66, "fraction" should be changed to --traction--.

Column 5, line 5, "fraction" should be changed to --traction--.

Column 5, line 7, "fraction" should be changed to --traction--.

In the Claims

Column 14, Claim 18, line 32, "fraction" should be changed to --traction--.

Signed and Sealed this
Twenty-fourth Day of June, 2014

Michelle K. Lee
*Deputy Director of the United States Patent and Trademark Office*